United States Patent

[11] 3,581,234

[72] Inventor Milton D. Bloomer
Scotia, N.Y.
[21] Appl. No. 883,750
[22] Filed Dec. 10, 1969
[45] Patented May 25, 1971
[73] Assignee General Electric Company

[54] BIAS AND TEMPERATURE COMPENSATING CIRCUIT FOR TUNNEL DIODE OSCILLATORS
9 Claims, 6 Drawing Figs.

[52] U.S. Cl. .......... 331/107T, 307/286, 307/322
[51] Int. Cl. .......... H03b 7/08
[50] Field of Search .......... 331/107; 307/286, 322

*Primary Examiner*—John Kominski
*Attorneys*—Paul A. Frank, John F. Ahern, Julius J. Zaskalicky, Frank L. Neuhauser, Oscar B. Waddell and Joseph B. Forman

ABSTRACT: A compensation technique for tunnel diode oscillators is disclosed wherein the peaks in the characteristic curves (frequency vs. bias) for various operating temperatures are made to coincide in the region of the peak. The effects of bias and temperature are separately compensated and two techniques are disclosed for compensating each.

Inventor:
Milton D. Bloomer,
by Paul A. Frank
His Attorney.

Inventor:
Milton D. Bloomer,
by Paul A. Frank
His Attorney.

BIAS AND TEMPERATURE COMPENSATING CIRCUIT FOR TUNNEL DIODE OSCILLATORS

In a conventional tunnel diode oscillator, the operating temperature and the bias voltage supplied to the tunnel diode affect the output frequency of the oscillator. Other attempts to compensate for these effects deal mainly with operating the tunnel diode in the region of least temperature effect and then trying to regulate the bias. In this region, however, the slope of the frequency-bias curve is fairly steep, thereby making the oscillator sensitive to variations in the bias level.

In view of the above, it is an object of the present invention to compensate a tunnel diode oscillator for bias and temperature variations by operating the oscillator along the peak of the frequency-bias curve, where the slope is essentially zero.

A further object of the invention is to compensate a tunnel diode oscillator for temperature and bias variations by adjusting circuit parameters until the frequency-bias curves at different temperatures have their peaks coinciding.

Another object of the invention is to compensate a tunnel diode oscillator for temperature and bias variations by separately compensating for the temperature induced frequency shifts and the temperature induced shifts of the peaks of the frequency-bias curves of the oscillator at various temperatures.

Yet a further object is to provide the above compensation by utilizing components having negative temperature coefficients.

Yet another object is to provide the above compensation by modifying the current-bias curve of the tunnel diode itself.

The foregoing objects are achieved by the present invention by utilizing a temperature responsive device in the bias circuit for a conventional tunnel diode oscillator and by utilizing a separate temperature responsive device to vary the frequency of the oscillator at a constant value of bias. By virtue of these two compensations, the peaks on the frequency-bias curves for various temperatures are made to coincide. The oscillator is then much less sensitive to temperature variations and, because it is operating on the peak of the curve where the slope is essentially zero, the oscillator is also much less sensitive to variations in bias.

The full scope of the invention may be better understood by considering the following detailed description in conjunction with the attached drawings in which.

Figure 1:
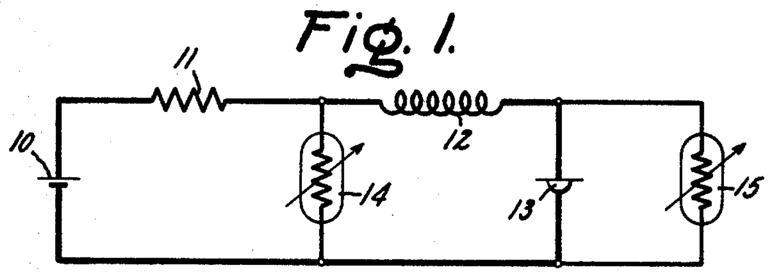
FIG. 1 illustrates a conventional tunnel diode oscillator and one form of the present invention.

Referring to FIG. 1, there is shown in the heavy lined portion a conventional tunnel diode oscillator comprising a source of operating voltage 10, coupling and biasing resistor 11, a tuning inductor 12 and tunnel diode 13 all connected in a series circuit. The operation of a conventional tunnel diode oscillator is fairly well known and is shown by a portion of FIG. 3.

Figure 3:
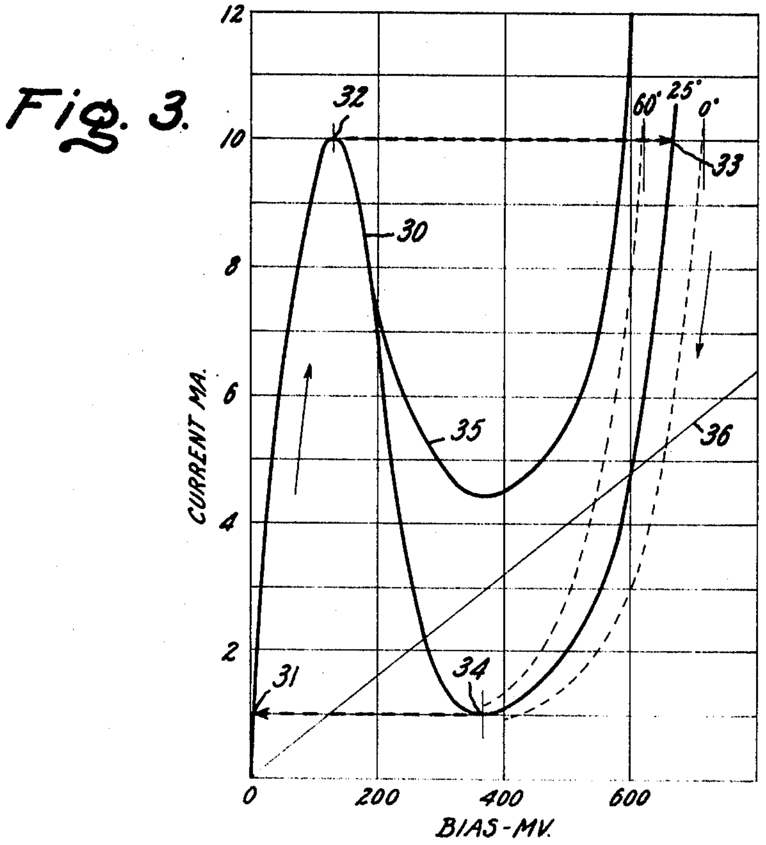
FIG. 3 illustrates the static characteristics of a tunnel diode, useful in understanding the present invention.

As is known, the tunnel diode oscillator acts as a relaxation oscillator and utilizes as its fundamental principle the fact that the current must be the same at all points in a series circuit. Referring to FIG. 3, when the tunnel diode oscillator is first turned on, the current increases from zero and proceeds through point 31 upward to a voltage peak point 32. At this point, with increasing bias voltage, the current through the tunnel diode tends to decrease whereas the current in the remainder of the circuit tends to increase. Since the current must be uniform throughout the circuit, the tunnel diode flips states and proceeds virtually instantaneously from operating at point 32 to operating at point 33. From point 33, the voltage drop across diode 13 decreases in the conventional manner to point 34. At this point, any decrease in voltage across the tunnel diode tends to cause an increase in the current through the device, therefore the tunnel diode 13 flips states and operates at point 31 instead of at point 34. Each full cycle of oscillation then follows this route of points 31 through 34. The time it takes the diode to proceed from point 31 to 32 and from 33 to 34 determine the output frequency.

Also shown in FIG. 3 is a set of dashed lines representing the operation of the circuit at temperatures other than 25° C. It can be seen from FIG. 3 that operating at a temperature other than the 25° C. as shown will cause a change in the time that it takes the tunnel diode to go from point 33 to point 34 because the length of the path changes. In order to compensate for this, there is included in one embodiment of the invention a corrective element 15 illustrated in FIG. 1 as a negative temperature coefficient resistance. Resistance 15 serves to modify the base line as shown in FIG. 3 and to raise the curve 30 so that any change induced by a temperature change in the diode is corrected by a current change due to the change in resistance 15. The addition of element 15 with characteristic 36 of FIG. 3 in parallel with the tunnel diode 13 has the effect of raising the curve 30 to the position shown as curve 35. It is to be understood, of course, that the relative change as shown FIG. 3 is greatly exaggerated for illustrative purposes only.

Also shown in FIG. 1 is a second negative temperature coefficient resistance 14 connected in parallel with the series connected inductor 12 and the tunnel diode 13. This variable resistance serves to modify the bias voltage supplied to the oscillating tunnel diode.

Figure 4:
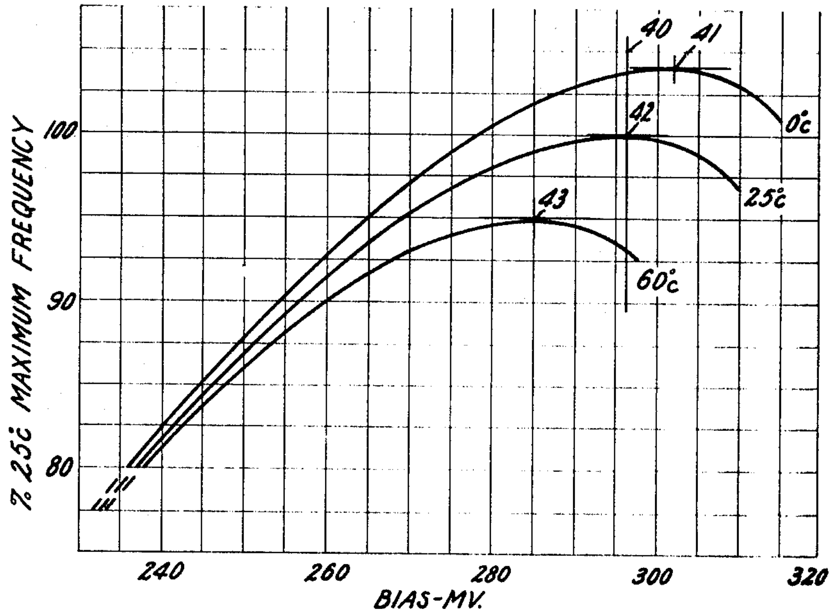
FIG. 4 illustrates the characteristics of a conventional, uncompensated tunnel diode oscillator.

In order to more fully understand the functions served by elements 14 and 15 reference is made to FIG. 4 in which there is shown a set of curves showing the operating characteristics of the tunnel diode oscillator at different temperatures. As can be seen from FIG. 4, the curves of frequency vs. bias have their peaks moved both in frequency and in bias level as the temperature decreases from 60° C. to 0° C. That is, the peak points 41, 42 and 43 occur at both a different bias value and a different frequency value. In accordance with the present invention, the effect on the operating frequency and the bias level are treated separately and corrected separately by elements 14 and 15 as shown in FIG. 1. Element 14, the negative temperature coefficient resistance which modifies the bias level, serves to translate the peaks 41, 42 and 43 to what may be called an isovoltage line 40 as shown in FIG. 4.

Figure 5:
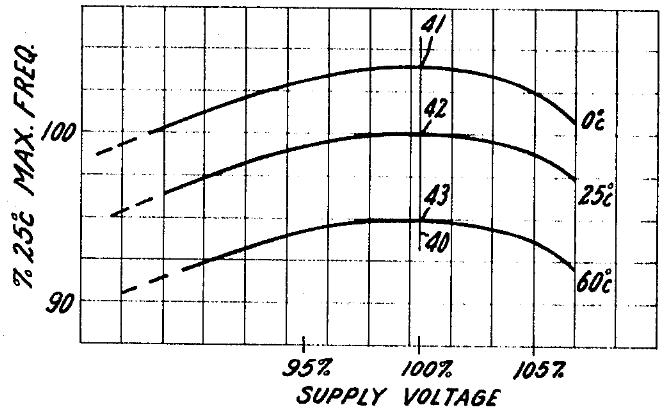
FIG. 5 illustrates the characteristic curves of a partially compensated tunnel diode oscillator according to the present invention.

There is shown in FIG. 5 the net result of utilizing element 14 in the circuit shown in Fig. 1. As can be seen from FIG. 5, the peaks of the curves for the different temperatures coincide along a single value of the bias voltage. In order to fully compensate the oscillator one must then translate the curve so that the peaks 41, 42 and 43 all coincide at the same point as shown as point 47 in FIG. 6. This is accomplished by the operation of element 15 which serves to modify the frequency of the oscillator at a fixed bias voltage by modifying its operating curve as shown in FIG. 3 by the line 35. As can be seen from FIG. 5, if the temperature should increase from 0° C. to 60° C., the effect is to decrease the peak frequency at a constant supply voltage. At the same time, the resistance of element 15, illustrated in FIG. 3 as line 36, decreases. This alters the composite curve 35 so as to reduce the path lengths 31–32 and 33–34 thereby increasing the frequency and thus compensating the above noted decrease in peak frequency. Thus, there can be seen from a consideration of FIGS. 1 and 4—6 that the tunnel diode and oscillator of FIG. 1 is both frequency and bias compensated at various operating temperatures. This enables the oscillator to be utilized at the peak frequency as opposed to the frequency of least temperature variation as used in the prior art. At this peak frequency, since the slope is zero or very nearly zero, the effect of bias supply voltage variations is minimal and the circuit parameters provide temperature compensation so that there is provided a very stable oscillator. The element 14 in FIG. 1 serves to compensate for bias voltages and translates the peaks 41 through 43 to an isovoltage line. The negative temperature coefficient element 15 in FIG. 1 also serves as a translating means but translates the peak values of the curves for the different temperatures to a single point along the isovoltage line such as the point 47 as shown FIG.. 6.

Figure 2:
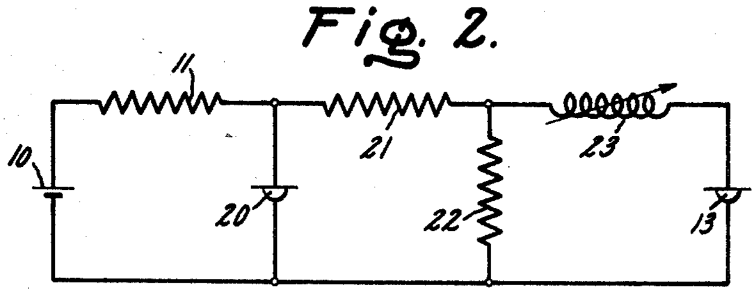
FIG. 2 illustrates another embodiment of the present invention.
Figure 6:
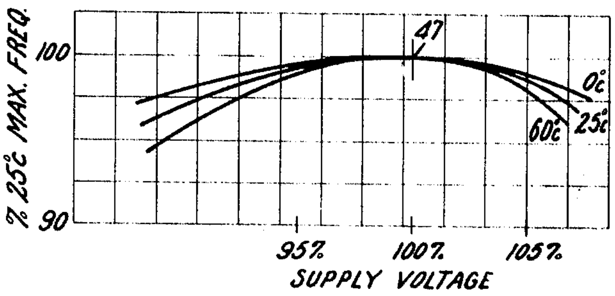
FIG. 6 illustrates the characteristic curves of a fully compensated tunnel diode oscillator according to the present invention.

In FIG. 2 where is shown an alternate embodiment of the invention wherein element 20 is a tunnel diode which may be similar to the oscillating tunnel diode 13 and which serves as a bias voltage compensating element by modifying the bias voltage to the oscillator in accordance with temperature variations. The operating point of diode 20 is in the vicinity of point 33 of FIG. 3. Elements 21 and 22 in FIG. 2 serve to isolate the oscillating portion of the circuit from tunnel diode 20 and also to provide a portion of the biasing signal developed by tunnel diode 20 to the oscillating diode 13. Connecting tunnel diode 13 to the source of bias signal is a variable impedance 23 which is shown as an inductor having a negative temperature coefficient. Element 20 acts in the same manner as compensating element 14 in FIG. 1 and element 23 in FIG. 2 compensates in a similar manner to the element 15 in FIG. 1 and produce the same results as shown in FIGS. 4—6.

While shown in particular combinations of frequency and bias compensation, the elements of FIGS. 1 and 2 could obviously be interchanged as desired. For example, compensating element 23 could be used instead of the impedance element 12 in FIG. 1, thereby eliminating the need for element 15 as shown in FIG. 1, conversely, any element shown in FIG. 1 for bias or frequency compensation could be used to replace the like element in FIG. 2.

What I claim as new and desire to secure by Letters Patent of the United States is:

1. A compensated tunnel diode oscillator comprising
   a tunnel diode oscillator whose operation is describable by a set of peaked curves of output frequency versus bias voltage at different temperatures,
   means for translating the peak of each curve to points along a predetermined isovoltage line, and
   means for translating the peak of each curve to a single point on said isovoltage line, whereby the peak of each curve occurs at the same frequency and bias voltage over a range of temperatures.
2. A device as set forth in claim 1 wherein:
   said oscillator comprises a series circuit including a source of operating voltage, a biasing element, an impedance element and a tunnel diode,
   said means for translating the peaks to points along an isovoltage line comprises an impedance having a negative temperature coefficient coupled in parallel with said impedance element and said tunnel diode, and
   said means for translating to a single point comprises a further impedance having a negative temperature coefficient connected in parallel with said tunnel diode.
3. Apparatus as set forth in claim 2 wherein said impedance is a resistor having a negative temperature coefficient.
4. Apparatus as set forth in claim 2 wherein said impedance is a second tunnel diode.
5. A device as set forth in claim 1 wherein
   said oscillator comprises a series circuit including a source of operating voltage, a biasing element and a tunnel diode,
   said means for translating the peaks to points along an isovoltage line comprises an impedance having a negative temperature coefficient coupled in parallel to said voltage source and said biasing element, and
   said means for translating to a single point comprises an impedance element having a negative temperature coefficient connected in series between the tunnel diode and said biasing element.
6. Apparatus as set forth in claim 5 wherein said impedance is a resistor having a negative temperature coefficient.
7. Apparatus as set forth in claim 5 wherein said impedance is a second tunnel diode.
8. Apparatus as set forth in claim 5 wherein said impedance element is an inductor.
9. A device as set forth in claim 1 wherein:
   said oscillator comprises a series circuit including a source of operating voltage, a biasing element, an impedance element and a tunnel diode,
   said means for translating the peaks to points along an isovoltage line comprises an impedance having a positive temperature coefficient of resistance connected in series with said impedance element and said tunnel diode, and
   said means for translating to a single point comprises a further impedance having a negative temperature coefficient connected in parallel with said tunnel diode.